(12) United States Patent
Moll et al.

(10) Patent No.: US 11,151,265 B2
(45) Date of Patent: Oct. 19, 2021

(54) SECURE DATA STORAGE BASED ON OBFUSCATION BY DISTRIBUTION

(71) Applicant: International Business Machines Corporation, Armonk, NY (US)

(72) Inventors: Georges-Henri Moll, Roquefort les Pins (FR); Oliver Oudot, Vallauris (FR); Philippe Kaplan, Le Rouret (FR); Xavier Nodet, Antibes (FR)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 16/397,392

(22) Filed: Apr. 29, 2019

(65) Prior Publication Data

US 2020/0342128 A1    Oct. 29, 2020

(51) Int. Cl.
| | |
|---|---|
| *G06F 21/62* | (2013.01) |
| *H04L 9/16* | (2006.01) |
| *H04L 29/06* | (2006.01) |

(52) U.S. Cl.
CPC ........... *G06F 21/62* (2013.01); *H04L 9/16* (2013.01); *H04L 63/0428* (2013.01)

(58) Field of Classification Search
CPC ..... G06F 21/60–629; G06F 11/08–085; G06F 11/10–1096; H04L 9/16; H04L 63/0428; H04L 2209/34
See application file for complete search history.

(56) References Cited

U.S. PATENT DOCUMENTS

| | | | |
|---|---|---|---|
| 7,636,724 B2 * | 12/2009 | de la Torre | ............. H03M 7/30 |
| 8,997,248 B1 | 3/2015 | Andrew | |
| 9,124,418 B2 | 9/2015 | Willoughby | |
| 2003/0084020 A1 * | 5/2003 | Shu | ............................ H04L 1/06 |
| 2004/0095831 A1 * | 5/2004 | Hino | ..................... H03M 5/145 365/222 |
| 2007/0079081 A1 * | 4/2007 | Gladwin | ............. G06F 21/6227 711/154 |

(Continued)

FOREIGN PATENT DOCUMENTS

CN    106059748 A    10/2016

OTHER PUBLICATIONS

"Polyalphabetic cipher", From Wikipedia, the free encyclopedia, last edited Apr. 9, 2019, 3 pps , <https://en.wikipedia.org/wiki/Polyalphabetic_cipher>.

(Continued)

*Primary Examiner* — Madhuri R Herzog
(74) *Attorney, Agent, or Firm* — Edward J. Wixted, III

(57) ABSTRACT

Aspects of the present invention disclose a method for securely storing data. The method includes one or more computer processors receiving, by one or more computer processors, a request to store data, wherein the data includes a plurality of elements. The method further includes generating a plurality of elements of encoded data by on applying one or more encoding algorithms to the data, wherein a quantity of the plurality of elements of the encoded data is equal to a quantity of the plurality of elements of the data. The method further includes distributing the plurality of elements of the encoded data into two or more subsets of the encoded data, without duplication. The method further includes transmitting the two or more subsets of the encoded data to a corresponding quantity of two or more storage systems.

17 Claims, 7 Drawing Sheets

(56) References Cited

U.S. PATENT DOCUMENTS

| 2013/0111166 | A1* | 5/2013 | Resch | G06F 11/1076 |
| | | | | 711/162 |
| 2013/0177153 | A1 | 7/2013 | Gerraty | |
| 2015/0154418 | A1 | 6/2015 | Redberg | |
| 2015/0242273 | A1* | 8/2015 | Resch | G06F 21/62 |
| | | | | 714/763 |
| 2016/0021185 | A1 | 1/2016 | Peria | |
| 2017/0046230 | A1 | 2/2017 | Thomas | |
| 2018/0060612 | A1 | 3/2018 | Christopher | |
| 2018/0217898 | A1 | 8/2018 | Tormasov | |
| 2018/0278932 | A1 | 9/2018 | Debargha | |

OTHER PUBLICATIONS

Zhang, Haibin, "How Secure is Your Data When It's Stored in the Cloud?", Scientific American, Jan. 25, 2018, 10 pps., <https://www.scientificamerican.com/article/how-secure-is-your-data-when-it-rsquo-s-stored-in-the-cloud/>.

Mell et al., "The NIST Definition of Cloud Computing", National Institute of Standards and Technology, U.S. Department of Commerce, NIST Special Publication 800-145, Sep. 2011, 7 pages.

* cited by examiner

SECURE DATA STORAGE BASED ON OBFUSCATION BY DISTRIBUTION

BACKGROUND OF THE INVENTION

The present invention relates generally to the field of data security, and more particularly to obfuscating the data by encoding and distributing portions of the encoded data to different cloud-storage locations.

Cloud computing is an information technology paradigm that enables ubiquitous access to shared pools of configurable computing system resources over the internet. Some consumers (e.g., businesses, organization, government entities) of cloud computing services may own various data processing systems but utilize cloud computing services to provide additional computing resources (e.g., elastic scalability) to reduce costs. Other consumers of cloud computing services utilize the cloud as an interface between users and a business to provide improved response times by distributing applications and functions closer to the users to reduce network congestion that can occur with singular data processing locations and improve the customer experience. In addition to processing various business functions, cloud computing providers can provide individuals, providers of Internet-based services, and companies high-capacity cloud-storage solutions via an infrastructure as a service (IaaS) model. In an example, a company can host a website internally but outsource storage to an IaaS provider.

Cloud storage is a model of computer data storage in which the digital data is stored in logical pools. The physical storage can span multiple servers (sometimes in multiple locations), and the physical environment is typically owned and managed by a hosting company (i.e., service provider). In addition, cloud computing providers utilize a variety of security measures to safe-guard stored information and data, such as authentication and access monitoring, firewalls, user separation, intrusion detection and prevention, and security information and event logging systems. Thus, cloud-storage providers offer large quantities of storage capacity, just-in-time management of capacity, security, and durability, and "anywhere, anytime" access to data for data owners seeking geographical and provider diversity for data storage.

SUMMARY

Aspects of the present invention disclose a method, computer program product, and system for securely storing data. The method includes at least one computer processor receiving a request to store data, wherein the data includes a plurality of elements. The method further includes at least one computer processor generating a plurality of elements of encoded data by on applying one or more encoding algorithms to the data, wherein a quantity of the plurality of elements of the encoded data is equal to a quantity of the plurality of elements of the data. The method further includes at least one computer processor distributing the plurality of elements of the encoded data into two or more subsets of the encoded data, without duplication. The method further includes at least one computer processor transmitting the two or more subsets of encoded data to a corresponding quantity of two or more storage systems.

DETAILED DESCRIPTION

Figure 1:
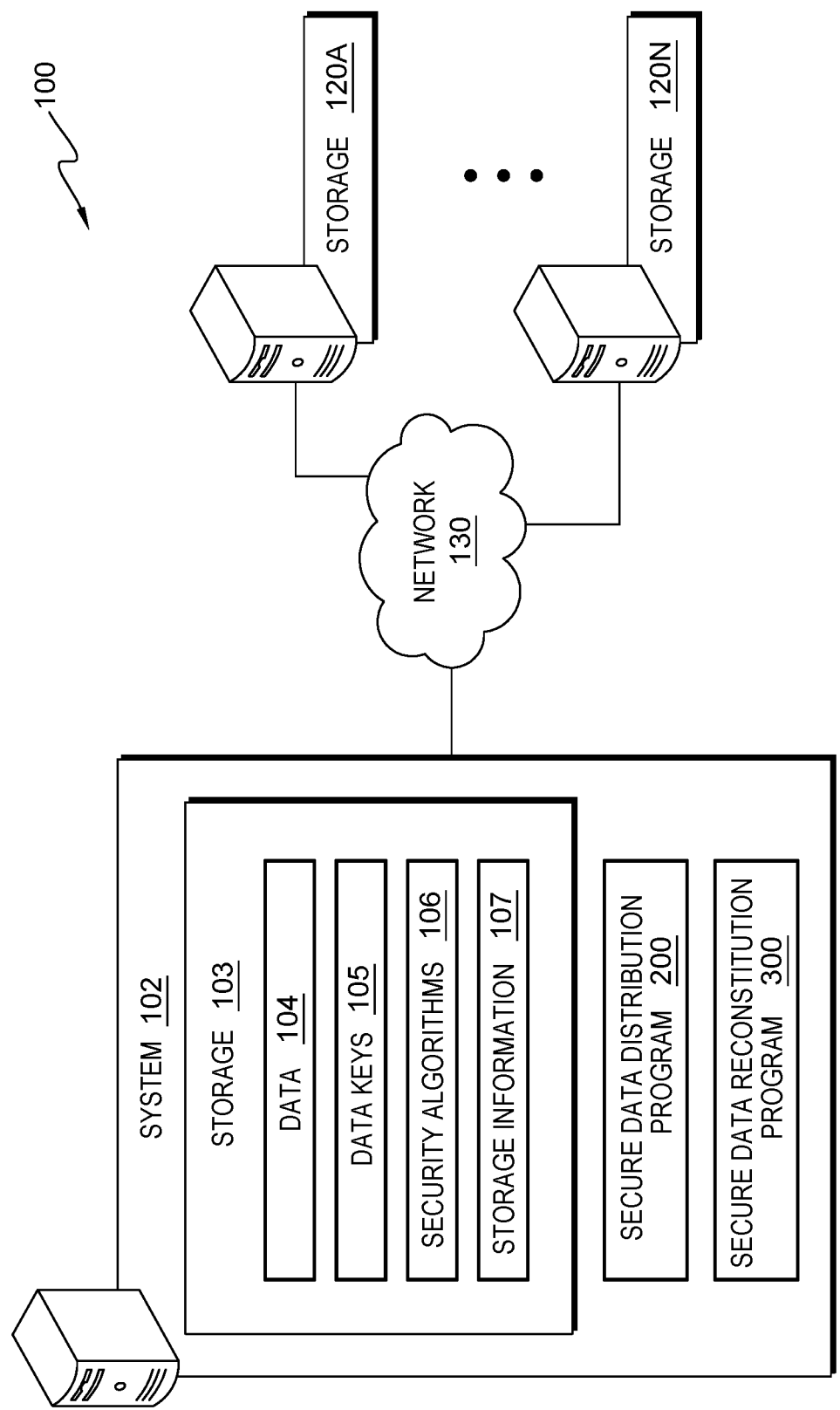
FIG. 1 is a functional block diagram of a portion of a cloud computing environment, in accordance with an embodiment of the present invention.

Embodiments of the present invention recognize that cloud computing allows companies to avoid or minimize up-front information technology (IT) infrastructure costs. In addition, embodiments of the present invention recognize that more companies are migrating applications to the cloud and that various companies are utilizing multi-cloud platforms and multiple service providers for data and applications. However, the owners of data may not wish to be tied to a particular service provider. The owners of the data want the flexibility to switch to another provider without losing data or making significant efforts in data transition. In response to the increasing criticality of data being stored, expectations of data owners are evolving to require more reliable mechanisms are in place to ensure availability and durability of the stored data. Embodiments of the present invention recognize that cloud-service providers already store public data on the cloud, such as published government statistics, cartography information, socially shared information, weather data, news, etc. However, embodiments of the present invention also recognize that private data is generally not stored on public-clouds because of security issues, trust issues, privacy concerns, regulations, etc. In this context, instead of storing data within a single cloud, data owners look to store data across multiple cloud platforms to ensure more security, redundancy, and reduce the potential threat of data compromise.

Embodiments of the present invention provide a solution for securely storing data in a trustable form based on a secure, distributed format among multiple cloud platforms, such as cloud-storage systems, public cloud and/or hybrid cloud systems. The secure, distributed format for the data described herein is referred to as chunks or more specifically, chunks of encoded data. Each chunk of encoded data is a subset (e.g., smaller group) of elements of data uniquely distributed from among the larger set of encoded elements of the data. Embodiments of the present invention encode the data for secure distributed storage prior to distributing the elements of the encoded data into two or more chunks of encoded data. Embodiments of the present invention encode the elements of the data utilizing one or more intra-data dependencies, recursive actions, and/or incremental (i.e., indexed) utilization of at least one element of the original data and/or at least one prior element of encoded data. Some embodiments of the present invention also utilize a data key comprised of other information that is utilized by one or more encode algorithms to further obfuscate the original data. Embodiments of the present invention utilize reversible functions to encode and decode data.

Embodiments of the present invention can further secure the data by distributing the encoded data into chunks of encoded data, such that if a single chunk of encoded data is lost, corrupted, or is not retrieved, then the whole of the original cannot be reconstituted (e.g., reproduced, regenerated) and decoded. In additional embodiments, individual chunks of encoded data cannot be decoded in isolation. Various embodiments of the present invention utilize one or more intra-data element dependencies and recursive operations (e.g., actions, calculations) as opposed to global operations to render reconstituting the whole original data impossible unless all the chunks of encoded data are retrieved, and the encoded data distribution algorithms are known in addition to the encoding and decoding algorithms.

Thus, some embodiments of the present invention render reconstituting the whole original data impossible in response to a loss or corruption of even a single byte or element of encoded data. An example of an intra-data element dependency is that the encoding value for a current element of data is based on the current value for an element of data and at least one prior encoded data element value. Each additional dependency, such an including at least one prior original data value to encode a current data value further strengthens the security aspects of the present invention associated with encoding and distributing the original data into chunks of encoded data. Decoding encoded data also includes intra-data element dependencies, such as the current value for an element of encoded data and at least one prior encoded data element value. Each additional dependency, such as utilizing at least one prior decoded data element value to decode a value of a current element of encoded data further strengthens the security of a decoding algorithm.

Various embodiments of the present invention further improve security related to the private data by distributing one chunk of encoded data to each of the different geographic locations and/or cloud-storage providers that are selected to store the chunks of encoded data that correspond to the original data. In an example, two chunks of encoded data may be stored in the same city if at least two cloud-storage providers have storage capacity available within the city.

Some embodiments of the present invention utilize duplication of chunks of encoded data for disaster recovery, such as if one or more cloud-storage providers do not offer data backup, or to ensure that if one geographic location is affected by a problem (e.g., natural disaster, power outage, network disruption, etc.) that the original data is still recoverable in a timely-manner based on accessing a secondary storage location. Embodiments of the present invention utilize one or more data verifications known in the art, such as a checksum or a hash function to ensure the integrity of the retrieved chunks of encoded data and/or the decoded data.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a portion of a cloud computing environment, generally designated environment 100, in accordance with one embodiment of the present invention, such as cloud computing node 10 (discussed in further detail with respect to FIG. 6). An embodiment of environment 100 includes: system 102 and a plurality of cloud-storage locations (e.g., storage 120A through storage 120N) all interconnected over network 130. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In other embodiments, FIG. 1 is a functional block diagram illustrating a portion of a networked-computing environment or a storage architecture different from a cloud computing environment, generally designated environment 100. In an example, one or more of storage 120A through storage 120N, may be representative of various types of storage system, such as a network-attached storage (NAS) systems or devices, storage area networks (SANs), and/or other storage devices.

System 102 and storage 120A through storage 120N may be laptop computers, tablet computers, netbook computers, personal computers (PC), desktop computers, personal digital assistants (PDA), smart phones, wearable devices (e.g., smart glasses, a smart watch, etc.), or any programmable computer systems known in the art. In certain embodiments, system 102 and storage 120A through storage 120N represent computer systems utilizing clustered computers and components (e.g., database server computers, application server computers, etc.) that act as a single pool of seamless resources when accessed through network 130, as is common in data centers and with cloud-computing applications. System 102 and storage 120A through storage 120N may include components, as depicted and described in further detail with respect to FIG. 5, in accordance with embodiments of the present invention. In general, storage 120A through storage 120N are representative of any programmable electronic device or combination of programmable electronic devices capable of executing machine-readable program instructions and communicating with system 102 and via network 130.

System 102 includes: storage 103, secure data distribution program 200 and secure data reconstitution program 300. System 102 also includes various programs, such as a website interface; one or more web daemons; a database management system; a network mapping program; a network communication program; various functions and/or programs to perform various mathematical, statistical, conversions, etc. In one embodiment, system 102 is representative of one or more computing systems within a cloud computing system. In another embodiment, system 102 is representative of one or more computing system of an organization, such as a business, a university, an enterprise, etc. In some embodiments, system 102 utilizes network 130 and one or more communication programs and/or protocols to poll or query storage 120A through storage 120N and obtain information related to the availability of storage locations, such as physical locations, storage provider information, storage costs, service level agreements (SLAs), data backup capabilities, etc. System 102 may store the information within storage information 107 for subsequent access by secure data distribution program 200.

In one embodiment, storage 103 includes data 104, data keys 105, security algorithms 106, and storage information 107. Storage 103 may also include various table, lists, associative arrays, databases and/or other programs (not shown). Data 104 includes a plurality of data associated with one or more entities (e.g., users, programs, enterprises, organizations, etc.) that utilize system 102 for secure distributed storage of data based on obfuscation by both encoding the data for distributed storage and distributing the encoded data into chunks of encoded data. In various embodiments, data within data 104 is uploaded or transferred to system 102 by various entities and/or executing programs (not shown) via network 130. In another embodiment, data within data 104 is generated within system 102 by one or more executing programs (not shown).

Data keys 105 includes a plurality of keys utilized by one security algorithms to encode and decode distributively stored data. In an embodiment, data keys 105 includes data keys includes data keys of various structures and/or formats. In an example, a data key within data keys 105 may be based on random numeric values, alphabetic characters, symbols, or a combination thereof. In another example, a data key may be a password or pass phrase input by a user or a program accessing system 102. In some embodiment, a data key within data keys 105 is based on a rule, such as the first ten digits of $\pi$, $\sqrt{2}$, or a fraction. In some embodiments, distribution program 200 executes one or more programs (e.g., functions) to convert information within a data key of data keys 105 into indexed numerical values. In one scenario, a converted data key is stored within data keys 105 and respectively associated with the original data key. In another scenario, a converted data key is stored within storage information 107 and associated with other information related to the data for distributed storage, such as storage location IDs, chunk IDs, sequence data associated with a plurality of chunks of encoded data.

Security algorithms 106 include a plurality of algorithms utilized to prepare data for secure distributed storage. Security algorithms 106 include algorithms to: encode data, distribute the encoded data into a plurality of chunks of encoded data, reconstitute (i.e., reconstruct) the encoded data from a plurality of retrieved chunks of encoded data, and decode the encoded data. An example of a set of algorithms to practice the current invention is presented below and is discussed in further detail with respect to FIG. 4. Security algorithms within security algorithms 106 may be developed by the administrators of system 102 and/or developed by a user of system 102 and utilized in association with the data associated with the user.

In various embodiments, data encode algorithms within security algorithms 106 are reversible functions (i.e., algorithms) that utilize the composition of the source data to perform various transformations (e.g., encodes). In one embodiment, one or more algorithms within security algorithms 106 utilizes a data key within data keys 105 to further obfuscated elements of data during the encoding of the data. In an embodiment, security algorithms 106 also includes one or more programs (e.g., functions) to convert information within a data key into indexed numerical values and/or to create a data key.

In some embodiments, algorithms include one or more constraints. In one scenario, a data encode algorithms includes a constraint, such as a variable (e.g., max_val) that must be at least a value of 1 greater than the maximum value of any element of data within the data to store. In an example, with respect to storing binary data, if that value of an element of data can range from 0 to 255, then max_val=256. In another scenario, if a data encode algorithm encodes data recursively and bases a current encode value on a value corresponding to one or more previously encoded element of data (e.g., an intra-data element dependency), then a data distribution algorithm is constrained to store elements of encoded data that interact in different chunks of encoded data. In an embodiment, security algorithms 106 includes one or more other criteria (e.g., rules) that affect whether and how an element of data is encoded. In an example, a criteria included in an encode algorithm may state that if K[i]=0, then E[i]=D[i].

Still referring to security algorithms 106, presented below is an example embodiment of a set of security algorithms for: encoding a plurality of elements of data included in the data for distributed storage, distributing the encoded elements of data into chunks of encoded data; and in response to needing to access the distributively stored data, retrieving and reconstituting the encode data from among a plurality of stored chunks of encoded data, and subsequently decoding the reconstituted encoded data to reproduce the data.

In the following example algorithms, a "%" symbol represents a modulo (i.e., modulus) operation. For example, a pair of encode algorithms includes: E[0]=(D[0]+K[0]) % max_val (herein referred to as algorithm ED1). Where E[0] represents the encode value for the first element (index value [i]=0) of the data. As used herein, index positions and index values are interchangeable. K[0] is the first value (index value [i]=0) for the data key of data keys 105 assigned to the data for secure distributed storage. With respect to the modulo operation (i.e., %) utilized herein, the value corresponding to the element to the left (i.e., (D[0]+K[0])) of the % symbol is the dividend. The value corresponding to the element to the right (i.e., max_val) of the % symbol is the divisor, and E[0] equals the remainder generated by the modulo operation for the first element of the data. In an embodiment, encode algorithms generate a quantity of elements of encoded data that is equal to (e.g., the same as) the quantity of elements of data of the data for secure distributed storage.

For data values corresponding to elements of data after the first data value (e.g., index values of i>0): E[i]=(E[i−1]+D[i−1]+D[i]+K[i % key_size]) % max_val (herein referred to as algorithm ED2). Algorithm ED2 includes encoding constraints (e.g., intra-data element dependencies) and/or at least one recursive action. A current element's encode value, E[i] for the corresponding element of data value D[i] is modified by an element of the data key (e.g., K[i % key_size]); and is further modified by both the prior encode value, E[i−1], and the prior data value, D[i−1]. Within algorithm ED2, the term K[i % key_size] produces a cyclical selection of elements from a data key to apply to the elements of data to encode based on generating a range of index values from 0 to (key_size−1) in response to key_size<data_size. Data_size is a value corresponding to the number (i.e., quantity) of elements of the data for secure distributed storage.

Still referring to security algorithms 106 and based on the constraints associated with the example encode algorithm, a related data "chunking" algorithm is discussed below. In an embodiment and based on the number (i.e., quantity) of locations selected to receive the encoded data for distributed storage, the quantity of chunk generated (nb_chunks) is >=2 and less than or equal to the quantity of available storage locations for the data. In an example, a set of data chunking and data element distribution algorithms include a size value corresponding to a quantity of elements included within a "chunk" (i.e., C) comprised of a portion of the encoded data as represented by: size[c]=(data_size+nb_chunks−1−c) div nb_chunks (herein referred to as algorithm CD1). Where c=an index value corresponding to a chunk. Within the discussed algorithms, the function "div" represents integer division of the value of the dividend (i.e., (data_size+nb_chunks−1−c)) and the value of the divisor (i.e., nb_chunks).

In an embodiment, distributing encoded elements of data into chunks is based on an algorithm that cyclically generates index values corresponding to each chunk and elements of data within a respective chunk. In response, encoded elements of data corresponding to the generated index values are distributed or assigned to into the chunks. In an example, $C[c][j]=E[c+j*nb\_chunks]$ (herein referred to as algorithm CD2) assigns the encoded information among chunks where $0<=c<nb\_chunks$ and $0<=j<size[c]$; and where "c" represents the index value of a chunk of encoded data and "j" represents the index value corresponding to an element of encoded data within a chunk of encoded data. In some embodiments, the index value of "c" for a chunk is respectively associated with an identifier (ID) corresponding to a chunk. In addition, in some scenarios a chunk ID corresponds to a sequence (e.g., 1, 2, 3, . . . ) related to the distribution of the encoded data into the chunks. In other scenarios, the sequence of chunks of encoded data can be indirectly associated with the chunk ID's, such as via an associative array.

Continuing the current set of security algorithms, in an embodiment, a corresponding algorithm for reconstituting (e.g., reproducing, reversing the distribution algorithm) the encoded data from the plurality of elements of data distributed into the chunks is represented by: $E[i]=C[i \% nb\_chunks][i\ div\ nb\_chunks]$ (herein referred to as algorithm RE1) for $0<=i<datasize$. Where the term [i % nb_chunks] of algorithm 3) corresponds to a chunk index and/or a related chunk ID, and [i div nb_chunks] corresponds to a set index values of elements within a chunk (previous discussed with respect to "j", where $0<=j<size[c]$.)

Completing the example set of data security algorithms are a pair of corresponding decoding algorithms that are applied to the reconstituted encoded data. Where the value for max_val is the same value of max_val utilized to encode the data, and where the index values correspond to the elements of the reconstituted encoded data. For example, $D[0]=(E[0]\ K[0]+max\_val) \% max\_val$ (herein referred to as algorithm DE1) is utilized to decode the initial (i.e., first) element of the reconstituted encoded data. Further, to decode subsequent elements of the reconstituted encoded data, $D[i]=(E[i]-E[i-1]-D[i-1]-K[i \% key\_size]+nb\_chunks*max\_val) \% max\_val$ (herein referred to as algorithm DE2) for $0<i<data\_size$. As previously discussed with respect to securing the data, algorithm DE2 includes at least one recursive action or intra-data dependency thus rendering the whole of the original data unrecoverable if a chunk of encoded data is missing or corrupted.

Storage information 107 includes information related to a plurality of data being prepared for distributed storage and/or already stored as chunks of encoded data among storage 120A through storage 120N. In one embodiment, storage information 107 includes information related to the data for distributed storage, such as one or more entities that stored the data and/or has access to the distributively stored data, storage location IDs, chunk IDs, a sequence associated with a plurality of chunks of encoded data (e.g., a chunk ID sequence based on a distribution algorithm), a data key utilized while encoding the data, data integrity verification/information, etc. In some embodiments, information within storage information 107 is stored within a data structure such as one or more tables and/or databases. In various embodiments, metadata related to chunks of encoded data (described in further detail with respect to FIG. 4) is also included within storage information 107 and further associated with the original data or a reference associated with the original data for distributed storage.

In another embodiment, some information within storage information 107 is obtained by system 102 querying a plurality of storage providers via network 130 to obtain information related to storage 120A through 120N, such as physical locations, storage provider information, storage costs, etc. In an embodiment, storage location IDs are further associated with a storage provider and/or a corresponding physical (e.g., geographic) location of a storage system. In some scenarios, storage IDs are assigned by system 102. In other scenarios, storage IDs correspond to information provided to system 102 by the storage provider respectively associated with storage 120A through storage 120N.

In some embodiments, secure data distribution program 200 and secure data reconstitution program 300 are services that an owner and/or developer an app subscribes to enable multi-version support for the app. Secure data distribution program 200 and secure data reconstitution program 300 may be implemented via one of the functions of management layer 80 of cloud computing environment 50, such as security 86 (described in further detail with respect to FIG. 6 and FIG. 7). Alternatively, or in addition to, secure data distribution program 200 and secure data reconstitution program 300 may be implemented via one of the virtualized aspects of workloads layer 90 of cloud computing environment 50, such as data security 96 (describes in further detail with respect to FIG. 6 and FIG. 7). In another embodiment, secure data distribution program 200 and secure data reconstitution program 300 are implemented within a storage environment different from and/or in addition to a public cloud-storage environment operates within another architecture, such as a mainframe, a networked-computing environment, and/or a distributed-computing environment to store chunks of encoded data among other internal storage locations associated with system 102.

Secure data distribution program 200 is a program that prepares data for secure storage within the cloud, such as a public cloud-storage environment. Various aspects of secure data distribution program 200 can be implemented to operate within other storage environments. In one embodiment, secure data distribution program 200 encodes elements of data in a numerical format for distributed storage utilizing one on more encoding algorithms. Secure data distribution program 200 may utilize a data key to further obfuscate the encoding of the elements of the data. In various embodiments, secure data distribution program 200 utilizes one ore more distribution algorithms to distribute the encoded elements of the data into chunks of encoded data. In an example embodiment, by distributing the encoded data into chunks of encoded data, secure data distribution program 200 can render the whole original data unrecoverable unless all of the chunks of encoded data associated with the original data are retrieved and the distribution order of the encoded elements of data into the chunks of encoded data is also known.

In another embodiment, if secure data distribution program 200 determines that the data for distributed storage was previously stored and that the current version of the data is changed, then based on a lack of a backup dictate, secure data distribution program 200 deletes the chunks of encoded data within distributed storage before storing the chunks of encoded data corresponding to the current version of the data. Secure data distribution program 200 may reuse one or more storage locations to store the chunks of encoded data corresponding to the current version of the data, or secure data distribution program 200 may select a different set of storage to store the chunks of encoded data corresponding to the current version of the data. In an embodiment, secure data distribution program 200 migrates data for distributed storage into RAM (not shown) of system 102 to improve the performance of one or more security algorithms prior to transmitting the chunks of encoded data to a set of storage locations.

Secure data reconstitution program 300 is a program that identifies data that was distributively stored, retrieves the plurality of chunks of encoded data that comprise the distributively stored data, and decodes the encoded data after reconstituting the encoded data from the plurality of retrieved chunks of encoded data. In one embodiment, secure data reconstitution program 300 operates to reconstitute data from a plurality of chunks of encoded data distributed among two or more cloud-storage locations. In some embodiments, secure data reconstitution program 300 is automatically executed by a security program, function, and/or API in response to a user and/or a program indicating to access the distributively stored data.

In various embodiments, secure data reconstitution program 300 utilizes replicated or backed-up chunks of encoded data to reconstitute the encoded data. Secure data reconstitution program 300 can utilize one or more data integrity verification methods to ensure that a replicated chunk of encoded data is an exact duplicate of a missing or corrupted chunk of encoded data. In an embodiment, secure data reconstitution program 300 stores the retrieved chunks of encoded data and/or the reconstituted encoded data within RAM (not shown) of system 102 to improve the performance of one or more security algorithms.

In one embodiment, system 102 communicates through network 130 to storage 120A through storage 120N. In another embodiment, network 130 may also connect system 102 to one or more nodes of cloud computing environment 50 (discussed in further detail with respect to FIG. 6) that include one or more services, such as monitoring software agreements (discussed in further detail with respect to FIG. 7). In an example, network 130 may include a networking agent/daemon that routes network traffic associated with apps licensed to utilize one or more embodiments of the present invention to system 102. Alternatively, network 130 may route network traffic associated with apps not licensed to utilize embodiments of the present invention to another node within cloud computing environment 50.

Network 130 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 130 can be any combination of connections and protocols that will support communications between system 102 and storage 120A through storage 120N, in accordance with embodiments of the present invention. In various embodiments, network 130 operates locally via wired, wireless, or optical connections and can be any combination of connections and protocols (e.g., personal area network (PAN), near field communication (NFC), laser, infrared, ultrasonic, etc.). In some embodiments, an instance of network 130 is a virtual LAN (VLAN) that connects two or more virtualized entities (not shown) of cloud computing environment 50. In other embodiments, network 130 is representative of one or more LANs and/or VLANs within an instance of environment 100 that is a networked computing environment that enables communications between system 102 and storage 120A through storage 120N.

In one embodiment, storage 120A through storage 120N are representative of a plurality of storage systems of respective different geographic locations. In various embodiments, one or more of storage 120A through storage 120N are included within cloud-storage systems and/or cloud computing environments. In some embodiments, the cloud-storage systems and/or cloud computing environments hosting respective instances of a storage 120 correspond to two or more different vendors or cloud-service providers. In another embodiment, storage 120A through storage 120N are representative of a plurality of storage systems and/or storage devices of a networked-computing environment, a distributed-computing environment, etc. associated with system 102.

Figure 2:
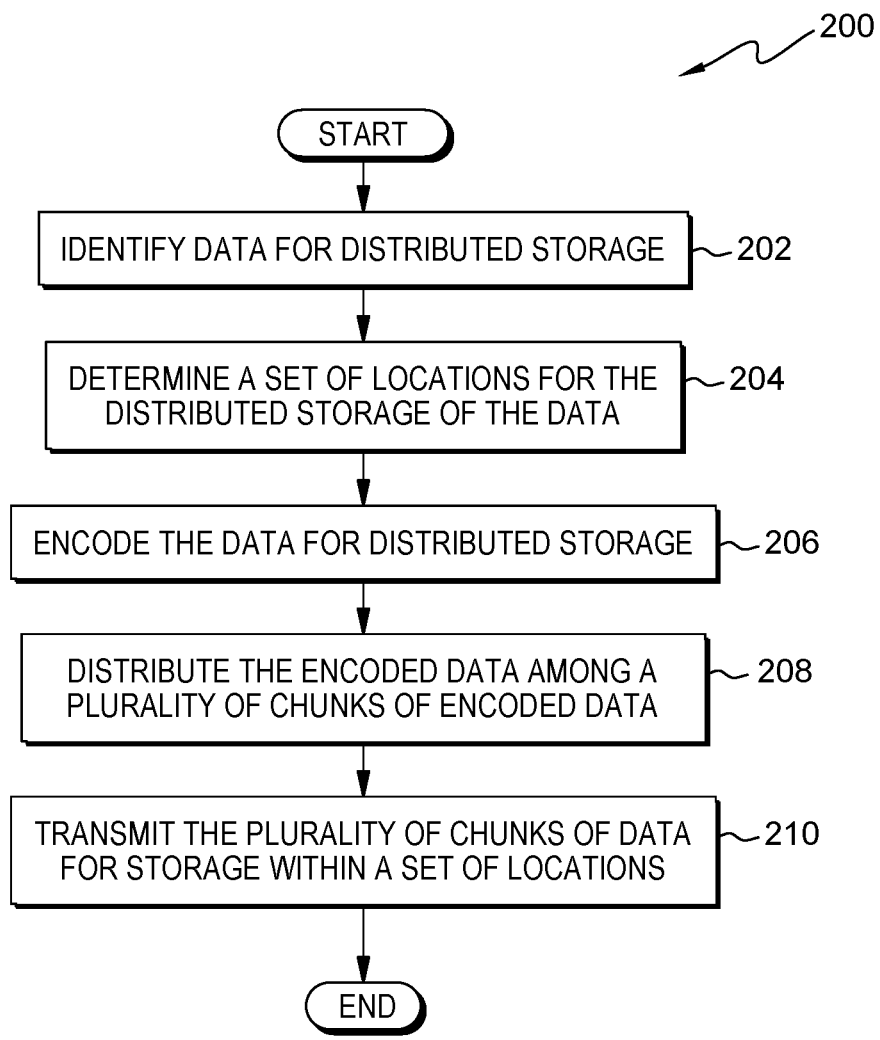
FIG. 2 is a flowchart depicting operational steps of a secure data distribution program, in accordance with an embodiment of the present invention.

FIG. 2 is a flowchart depicting the operational steps of secure data distribution program 200, a program that securely stores data by encoding data, distributing the encoded data into smaller sets of data, and transmitting the smaller sets of data to a plurality of storage locations, in accordance with embodiments of the present invention. In various embodiments, some of the information identified and/or updated by secure data distribution program 200 is subsequently utilized by aspects of secure data reconstitution program 300 to retrieved and reconstitute the distributively stored data.

In step 202 secure data distribution program 200 identifies data for distributed storage. In one embodiment, secure data distribution program 200 identifies data, within data 104, for distributed storage based on information obtained from a user, a program, a security function, and/or based on security rules associated with the data. In some embodiments, secure data distribution program 200 determines other information associated with the data for secure distributed storage, such as a value or range of values corresponding to the quantity of storage locations to distribute the data among, a dictate associated with a data key (e.g., key length, key ID, rules related to data keys, etc.), a maximum value identified among the elements that comprise the data to store, etc. In another embodiment, secure data distribution program 200 determines information associated with the data for secure distributed storage within data keys 105, security algorithms 106, and/or storage information 107. Secure data distribution program 200 may identify constraints associated with the data for secure distributed storage, such as cost or government regulations.

In an embodiment, secure data distribution program 200 may utilize various functions and/or programs (not shown) installed on system 102 to perform various mathematical, statistical, conversions, etc., to obtain information related to the data for distributed storage, such as a size corresponding to the data, max_val related to the data, index values for elements of keys and the data, and generating tables/associative arrays that link information associated with the data for distributed storage. In various embodiments, secure data distribution program 200 also identifies a set of algorithms that are utilized in association with the data for distributed storage, such as data encoding, data chunking, and data distribution algorithms.

In step 204, secure data distribution program 200 determines a set of locations for the distributed storage of the data. In an embodiment, secure data distribution program 200 determines a set of locations and/or storage IDs for the distributed storage of data based on information available within storage information 107. Subsequently, secure data distribution program 200 may include and/or update other information related to the distributed storage of the data within storage information 107. In various embodiments, secure data distribution program 200 utilizes network 130 to poll one or more cloud-storage providers to identify locations, such as storage 120A through storage 120N that are available to store the chunks of encoded data that comprise the data for distributed storage. In one embodiment, secure data distribution program 200 determines a set of locations based on information related to the quantity of storage locations associated with the data for distributed storage (in step 202).

In another embodiment, secure data distribution program 200 determines a set of locations for distributed storage of the data based on the quantity of available locations identified in response to polling the one or more cloud-storage providers. In some embodiments, secure data distribution program 200 identifies one or more storage locations in addition to the quantity of storage locations dictated by information associated with the data for distributed storage. Subsequently, secure data distribution program 200 utilizes one or more constraints or rules to determine the set of locations for the distributed storage of the data. In other embodiments, secure data distribution program 200 determines a set of storage locations for the distributed storage of the data based on one or more storage architectures different from cloud-storage environment.

In step 206, secure data distribution program 200 encodes the data for distributed storage. Secure data distribution program 200 utilizes one or more encode algorithms to generate a plurality of elements of encoded data that are respectively associated with the plurality of elements of the original data for distributed storage. In one embodiment, secure data distribution program 200 encodes the data for distributed storage utilizing one or more encode algorithms within security algorithms 106 dictated by information associated with the data for secure distributed storage. In another embodiment, secure data distribution program 200 encodes the data for distributed storage utilizing one or more encode algorithms selected from security algorithms 106.

Figure 4:
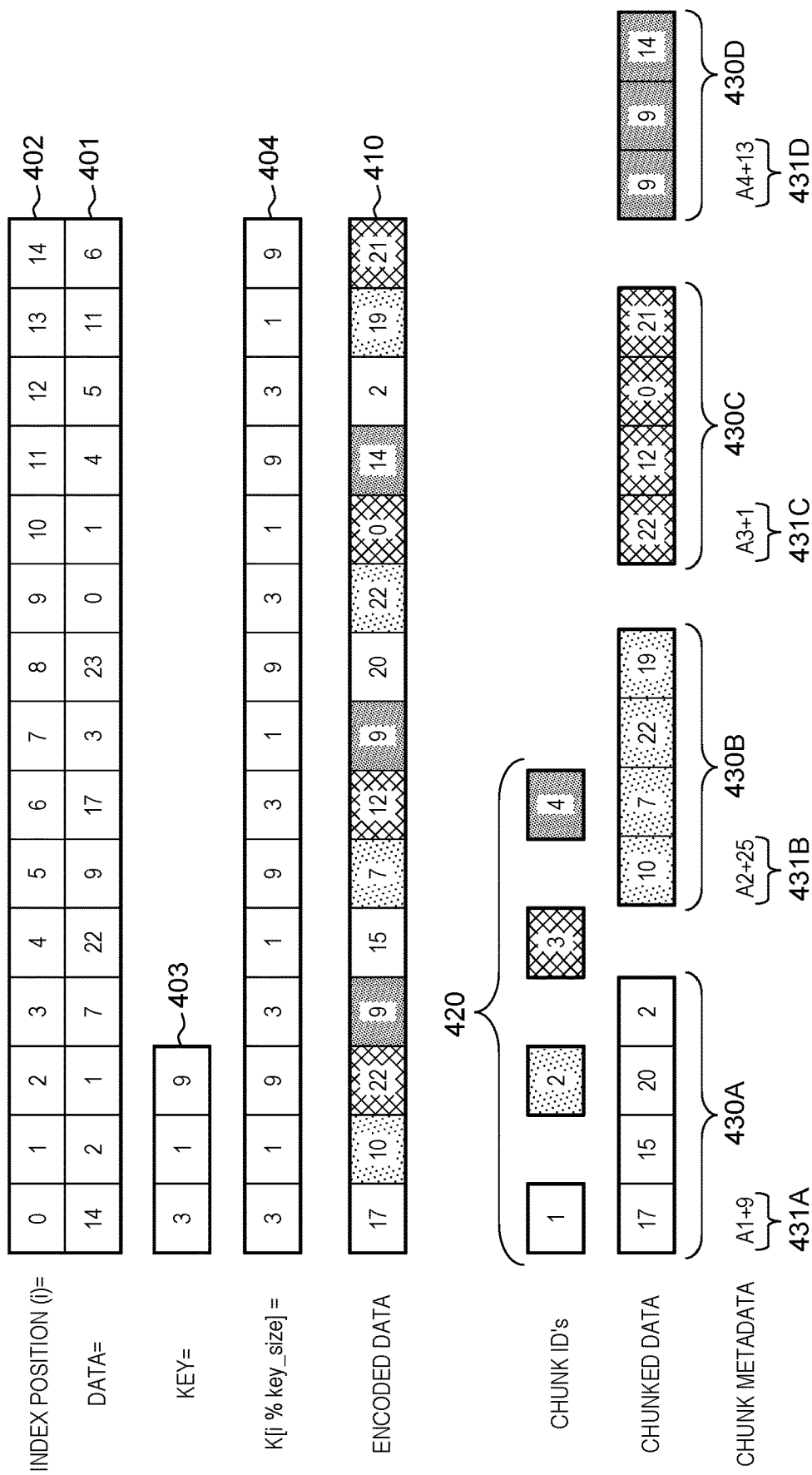
FIG. 4 is an illustrative example of encoding data utilizing a data key, distributing the encoded data into chunks prior to storing the encoded data, and utilizing metadata to associated information with the chunks of encoded data, in accordance with at least one embodiment of the present invention.

In some embodiments, secure data distribution program 200 utilizes one or more encode algorithms that further obfuscate the encoded data by applying one or more numeric values from a data key (discussed in further detail with respect to FIG. 4). If secure data distribution program 200 determines that a data key is based on one or more rules and/or includes non-numeric characters, then secure data distribution program 200 utilizes one or more conversions and/or rules to generate a version of data key that includes numeric values. In various embodiments, secure data distribution program 200 updates information associated with the data for secure distributed storage based on the identified information related to encoding the data for distributed storage, such as a max_val variable, a data key from data keys 105, information identifying the one or more utilized encode algorithms, a numeric version of a data key, a checksum or hash value corresponding to the encoded data, etc.

In step 208, secure data distribution program 200 distributes the encoded data among a plurality of chunks of encoded data. In an embodiment, secure data distribution program 200 distributes the encoded data into a quantity of chunks (e.g., nb_chunks) of encoded data corresponding to the quantity of storage locations within the determined set of storage locations. Secure data distribution program 200 may further determine and/or associate information, such as an ID, sequence information, and a size value corresponding to the chunks of encoded data (discussed in further detail with respect to FIG. 4), a checksum or hash value for each chunk of encoded data, etc.

In some embodiments, secure data distribution program 200 distributes the encoded the data utilizing one or more data chunking and data distribution algorithms within security algorithms 106 and as dictated by information associated with the data for distributed storage (previously discussed with respect to security algorithms 106). In another embodiment, secure data distribution program 200 distributes the encoded the data utilizing one or more data chunking and data distribution algorithms selected from security algorithms 106. In various embodiments, if secure data distribution program 200 determines that a utilized encode algorithm include an intra-data element dependency, then secure data distribution program 200 utilizes a data distribution algorithm that is compatible with the intra-data element dependency (discussed in further detail with respect to FIG. 4).

In step 210, secure data distribution program 200 transmits the plurality of chunks of encoded data for storage within a set of locations. In various embodiments, secure data distribution program 200 executes one or more communication protocols to establish communication and authenticate (e.g., establish access) via network 130 to the determined set of cloud-based storage locations (e.g., among storage 120A through storage 120N) that store the chunks of encoded data. In one embodiment, in response to secure data distribution program 200 receiving acknowledgements that each of the transmitted chunks of encoded data is successfully stored, secure data distribution program 200 deletes the original data from data 104. In some embodiments, if secure data distribution program 200 cannot store a chunk of encoded data within a storage location (e.g., an authentication failure, a timeout, connectivity problems, issue, another availability issue, etc.) from among the determined set of storage location, then secure data distribution program 200 selects another storage location for the chunk of encoded data from among the determined one or more additional (e.g., alternative) storage locations.

In an embodiment, in response to secure data distribution program 200 receiving acknowledgements that each of the transmitted chunks of encoded data is successfully stored, secure data distribution program 200 updates storage information 107 identifying the locations corresponding to a chunk of encoded data. Secure data distribution program 200 updates storage information 107 based on the information related to the distributed storage of the data, such as updating metadata information and/or other data structures (e.g., a database, a table, an associative array, etc.) that store information related to the distributed storage of the data.

Figure 3:
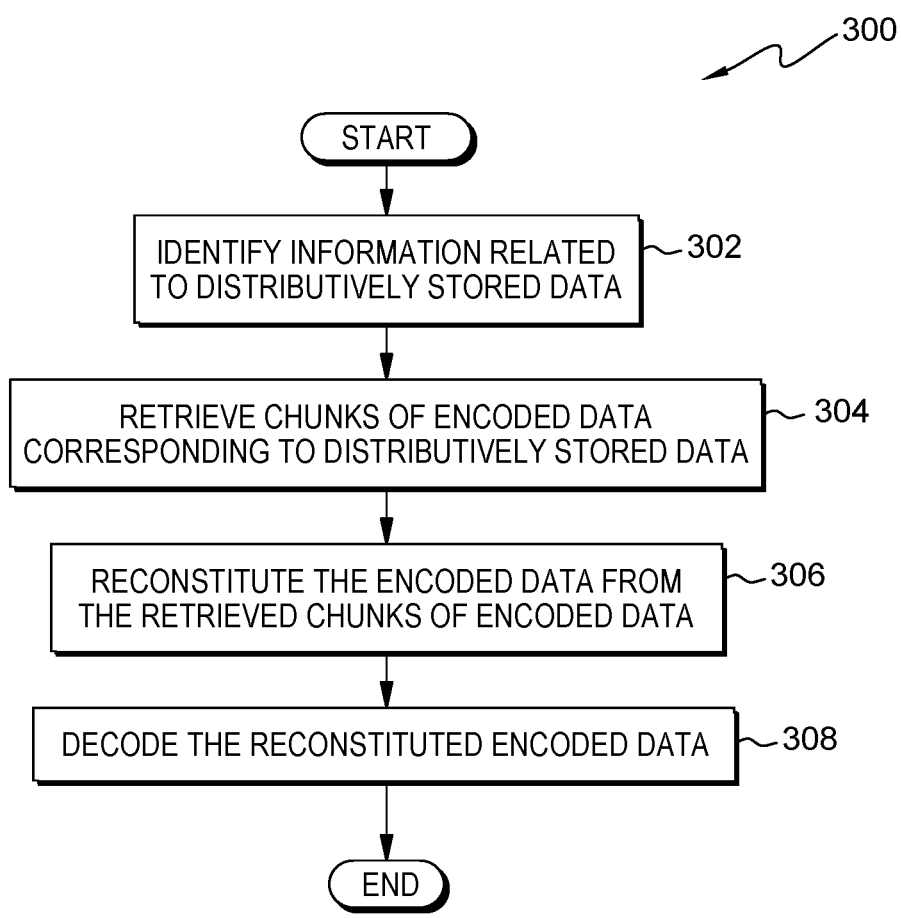
FIG. 3 is a flowchart depicting operational steps of a secure data reconstitution program, in accordance with an embodiment of the present invention.

FIG. 3 is a flowchart depicting operational steps of secure data reconstitution program 300, a program that restores the data that was distributed for secure storage by retrieving, reassembling, and decoding the plurality of chunks of encoded data that were distributed for secure storage among a plurality of locations, in accordance with embodiments of the present invention.

In step 302, secure data reconstitution program 300 identifies information related to distributively stored data. Secure data reconstitution program 300 may respond to a request to retrieve and restore distributively stored data to system 102 based on receiving the request from one or more entities that utilize system 102, such as user, software applications, and/or system functions. In an embodiment, secure data reconstitution program 300 identifies information related to distributively stored data based on information within storage information 107. In an example, secure data reconstitution program 300 identifies information within storage information 107 related to the distributively stored data, such as chunk IDs, a sequence related to the chunks of encoded data (e.g., a chunk ID sequence), storage locations corresponding to chunks of encoded data, a set of security algorithms utilized to prepare the data for distributed storage, a data key applied while encoding the data, etc. Secure data reconstitution program 300 may also identify a specified location to store the reconstituted data. In some embodiments, secure data reconstitution program 300 also identify other information the distributed data, such as whether secure data distribution program 200 utilized a backup (e.g., replication) strategy to distribute extra copies of the chunks of the encoded data, data integrity verification information, and information related to the storage of the extra copies of the chunks of encoded data.

In step 304, secure data reconstitution program 300 retrieves the chunks of encoded data corresponding to the distributively stored data. Secure data reconstitution program 300 utilizes the identified information related to distributively stored data within storage information 107 to identify the storage locations corresponding to chunks of encoded data corresponding to the distributively stored data. In some embodiment, secure data reconstitution program 300 executes one or more communication protocols to establish communication and authenticate (e.g., establish access) via network 130 to the instances of storage 120 that store the chunks of encoded data to retrieve. In various embodiment, secure data reconstitution program 300 retrieves the chunks of encoded data from the identified cloud-storage locations from among storage 120A through storage 120N (e.g., different geographical locations).

In another embodiment, in response to secure data reconstitution program 300 successfully retrieving the chunks of encoded data corresponding to the distributively stored data, secure data reconstitution program 300 deletes the chunks of encoded data from respective storage locations. Alternatively, based on information related to the distributively stored data, secure data reconstitution program 300 may leave the chunks of encoded data within respective storage locations.

In an embodiment, if secure data reconstitution program 300 determines that one or more locations that store the chunks of encoded data corresponding to the distributively stored data are not accessible (e.g., network problems, server problems, etc.), then secure data reconstitution program 300 determines whether secure data distribution program 200 utilized a replication strategy to distribute the chunks of encoded data corresponding to the distributively stored data. In response to determining that secure data distribution program 200 utilized a replication strategy, secure data reconstitution program 300 identifies one or more other (e.g., secondary, alternate) locations from among storage 120A through storage 120N that store a chunk of encoded data that cannot be retrieved from a primary storage location.

Still referring to step 304 in other embodiments, secure data reconstitution program 300 utilizes various communication methods to establish access one or more other instances of storage 120A through storage 120N that store the chunks of encoded data different from or in addition to cloud-storage locations, such as different storage nodes, servers, SANs systems, and/or NASs systems. In an embodiment, one or more of the other instances of storage 120A through storage 120N can be at the same geographic and/or physical location.

In step 306, secure data reconstitution program 300 reconstitutes the encoded data from the retrieved chunks of encoded data. In an embodiment, secure data reconstitution program 300 utilizes one or more algorithms for reconstituting data included within security algorithms 106 and information related to the distributively stored data to reconstitute the encoded data from the plurality of elements of encoded data distributed into the chunks of encoded data. In one embodiment, secure data reconstitution program 300 utilizes the chunk IDs and/or chunk sequence information to reconstitute (e.g., reassemble, rebuild, reproduce) the encoded data corresponding to the distributively stored data. In another embodiment, secure data reconstitution program 300 utilizes metadata associated with the chunks of encoded data to reconstitute encoded data corresponding to the distributively stored data. In various embodiments, secure data reconstitution program 300 utilizes the one or more reconstitution algorithms that reverse the processes of the data chunking and data distribution algorithms that were applied to the original encoded data corresponding to the distributively stored data.

In step 308, secure data reconstitution program 300 decodes the reconstituted encoded data. Secure data reconstitution program 300 decodes the reconstituted encoded data corresponding to the distributively stored data. In various embodiments, secure data reconstitution program 300 identifies other information obtained in step 302 related to decoding the encoded data corresponding to the distributively stored data. In an example, secure data reconstitution program 300 identifies the data key utilized to encode the data for distributed storage, information related to the data key (e.g., key_size, data key generation rules, etc.), and a decode algorithm corresponding to the encode algorithm utilized to encode the data for distributed storage. In one embodiment, secure data reconstitution program 300 decodes the reconstituted encoded data by utilizing the identified data key stored within data keys 105 and the corresponding decode algorithm included within security algorithms 106. In another embodiment, secure data reconstitution program 300 decodes the reconstituted encoded data by utilizing the identified data key and/or data key generation rule included in storage information 107 and associated with the distributively stored data.

FIG. 4 is an illustrative example of preparing data that includes a plurality of elements of data for secure distributed storage based on utilizing a set of security algorithms (e.g., algorithms ED1, ED2, CD1, CD2, RE1, DE1, and DE2) to encode the plurality of elements of data and subsequently distribute the encoded elements of chunks of encoded data, in accordance with embodiments of the present invention. FIG. 4 also depicts the output of various aspects some of the security algorithms applied to the data for secure distributed storage.

Data 401 is an example of data for secure distributed storage. In an embodiment, data 401 has associated metadata (not shown) related to a name or other identifier (e.g., data ID), such as "A." Metadata associated with data 401 may be included in storage information 107. In the illustrative example, data 401 is comprised of fifteen elements of data. In the illustrative example, row 402 depicts the index positions (e.g., index values) ranging from 0 to 14 and corresponding to the elements of data of data 401. In the depicted example, at index position i=0 the value of the corresponding element of data within data 401 is 14, and at i=10 the value of the corresponding element of data is 1. In an embodiment, secure data distribution program 200 determines (in step 202) that max_val=24 for encoding data for data 401 (e.g., 23+1). In addition, secure data distribution program 200 determines a value corresponding to the quantity of elements of data within data 401 (i.e., data_size=15).

In addition, secure data distribution program 200 also determines, based on information associated with data 401, such as a dictated associated with a data key, that the encode algorithm assigned to data 401 dictates a key of key_size=3. In the depicted example, key 403 consists of three elements: 3, 1, and 9, with respective index positions of 0, 1, and 2. In an embodiment, since the three elements of key 403 are numerical values, secure data distribution program 200 determines that no additional conversions or manipulations of information within key 403 are required.

In an embodiment, secure data distribution program 200 determines (in step 202) to utilize algorithm ED1 and algorithm ED2 (previously described with respect to security algorithms 106), $E[0]=(D[0]+K[0])$ % max_val and $E[i]=(E[i-1]+D[i-1]+D[i]+K[i \% key\_size])$ % max_val, to encode data 401 for secure distributed storage.

In an example, secure data distribution program 200 encodes (in step 206) data 401. In an embodiment, the term $K[i \% key\_size]$ of the example encode function cyclically applies a value from data key 403 among the elements of data 401 to encode. In the illustrative example, string 404 is the output of the term $K[i \% key\_size]$ applied to key 403. Based on the terms $K[0]$ and $K[i]$ within the pair of example encode algorithms, each element of string 404 is respectively applied to a data value of an element of data 401 with a corresponding index value. For example, for i=6, $K[6]=3$ and is utilized in response to encoding element of data $D[6]$ of data 401 (i.e., 17).

In the illustrative example, encoded data 410 depicts the output secure data distribution program 200 encoding data 401 utilizing key 403 and algorithm ED1 and algorithm ED2. In an embodiment, the index values of elements of data of data 401 also correspond to the index values of the elements of data of encoded data 410. In some embodiments, secure data distribution program 200 also determines (in step 206) that at least one of the dictated encode algorithms include an intra-data element dependency. For example, the above encode algorithms include intra-data element dependencies associate with a prior encode value (i.e., $E[i-1]$) and a corresponding prior value for an element of data (i.e., $D[i-1]$).

In an embodiment, secure data distribution program 200 determines (in step 204) that the value corresponding to the quantity of sites to receive the distributed data (i.e., data 401) to store is four; therefore, the quantity of subsets of data or chunks to create is four (e.g., nb_chunks=4). Further, in response to secure data distribution program 200 determining that an algorithm utilized to encode data 401 (i.e., algorithm ED2) includes one or more intra-data element dependencies, secure data distribution program 200 determines that encoded data 410 is distributed into four chunks and that each chunk of data is constrained from including data elements with corresponding index values that are sequential, such as $E[5]$ and $E[6]$ of encoded data 410. In some embodiments, the index value of "c" of a chunk is respectively associated with an identifier (ID) corresponding to the chunk of data for distributed storage, such as the chunk IDs of element 420.

In the illustrative example, chunk ID 1 is associated with chunk 430A, chunk ID 2 is associated with chunk 430B, chunk ID 3 is associated with chunk 430C, chunk ID 4 is associated with chunk 430D. In some embodiments, secure data distribution program 200 identifies that set of security algorithms associated with distributed storage of data 401 includes at one or more data chunking algorithms. One aspect of a data chunking algorithm determines a size value corresponding to a quantity of elements included within a "chunk ID" based on an index value corresponding to the chunk. In an example embodiment, a size corresponding to a chunk is determined by algorithm CD1. In an example, chunk ID 2, associated with chunk 430B, has a chunk index value=1 and a corresponding size value=4, indicating that four elements of encoded data 410 will be assigned to chunk 430B.

In an embodiment, secure data distribution program 200 cyclically distributes encoded data 410 into four chunks of encoded data. In the depicted example, secure data distribution program 200 utilizes a data chunking algorithm to cyclically determines index values corresponding to the elements of encoded data within encoded data 410 for distribution into the four chunk of data. In response, secure data distribution program 200 distributes (in step 208) the elements of encoded data corresponding to the determined index values into the chunk corresponding to the chunk IDs. In the illustrative example, secure data distribution program 200 utilizes algorithm CD2 to distribute the encoded data 410 into chunks with corresponding IDs of 1, 2, 3, and 4; where "c" is corresponds to the index value of a chunk and "j" represents the index value corresponding to an element within a chunk. For example, inputting the index values for the last element of the third chunk of data (i.e., chunk 430C) into algorithm CD2 yields, $C[2][3]=E[2+3*4]=E[14]$, which equates to the value of 21 within encoded data 410.

In the illustrative example, the cyclical distribution data encoded data 410 is depicted by shading corresponding to chunk IDs associated with element 420. In some embodiments, secure data distribution program 200 utilizes chunk IDs that indicate the order of the chunks of encoded data associated the data 401. In an example, elements of encoded data 410 depicted without shading correspond to chunk ID 1 (i.e., encode values of 17, 15, 20, and 2), depicted with speckled shading correspond to chunk ID 2 (i.e., encode values of 10, 7, 22, and 19), depicted with cross-hatched shading correspond to chunk ID 3 (i.e., encode values of 22, 12, 0, and 21), and depicted with high-density speckled shading correspond to chunk ID 3 (i.e., encode values of 9, 9 and 14).

In the illustrative example, chunk 430A represents the set of elements of encoded data and a corresponding order of elements of encoded data 410 of chunk ID 1. Similarly, chunk 430B represents the set of elements of encoded data and a corresponding order of the elements of encoded data 410 of chunk ID 2, chunk 430C represents the set of elements of encoded data and a corresponding order of the elements of encoded data 410 of chunk ID 3, and chunk 430D represents the set of elements of encoded data and a corresponding order of the elements of encoded data 410 of chunk ID 4.

In various embodiments, secure data distribution program 200 generates metadata associated with data 401 related to the distributed storage of encoded data 410. In the illustrative example, metadata 431A represents metadata related to chunk 430A. Similarly, metadata 431B represents metadata related to chunk 430B, metadata 431C represents metadata related to chunk 430C, and metadata 431D represents metadata related to chunk 430D. In an embodiment, secure data distribution program 200 generates metadata indicating a data ID corresponding to the original data (e.g., data 401), a chunk ID identifier, and a location identifier. Metadata(s) 431 depict an example of a metadata scheme. In the depicted example, metadata 431B is "A2+25", which indicates that chunk 430B is associated with data ID "A" and chunk ID of "2"; and "+" is an example of a data delineator, the information to the right of the delineator indicates the storage identifier "25" associated with storing the corresponding chunk of encoded data. In various embodiments, a storage identifier corresponds to a storage ID and/or storage location within storage information 107 that was identified to store a chunk of encoded data (in FIG. 2 step 204 and/or step 208). In an embodiment, metadata related to chunks of encoded data is included within storage information 107 and further associated with the original data for secure distributed storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
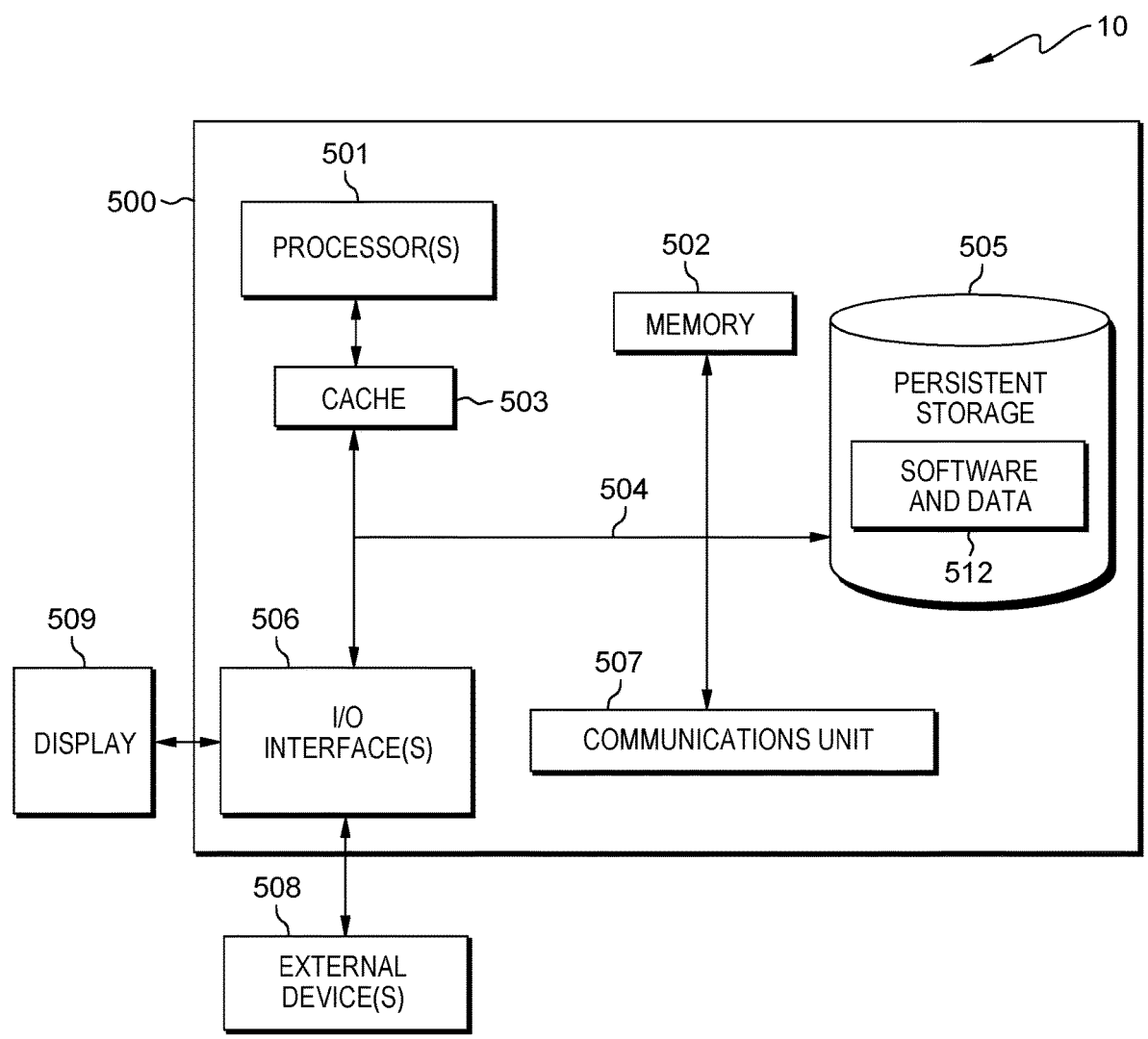
FIG. 5 is a block diagram of components of a computer, according to an embodiment of the present invention.

FIG. 5 is representative of various computing devices cloud computing node 10 (discussed in is only one example of a suitable cloud computing node and is not intended to suggest any limitation as to the scope of use or functionality of embodiments of the invention described herein. Regardless, cloud computing node 10 is capable of being implemented and/or performing any of the functionality of embodiments of the invention described herein.

Regardless, cloud computing node 10 is capable of being implemented and/or performing any of the functionality set forth hereinabove. In example embodiments, cloud computing node 10 is representative of system 102. In various embodiments, cloud computing node 10 may be representative of hardware physical instances of hardware elements and/or computing devices (e.g., RISC based servers 62, servers 63, etc.) and/or virtualized instance of hardware elements, computing devices (e.g., virtual servers 71, virtual storage 72, virtual networks 73, etc.) discussed further with respect to FIG. 7.

As shown in FIG. 5 in some embodiments, computer system 500 in cloud computing node 10 is shown in the form of a general-purpose computing device, such as system 102. In other embodiments, computer system 500 is representative of one or more computing devices connected to cloud computing environment 50, such as storage 120A through storage 120N. Computer system 500 is an example of a system that includes software and data 510. Computer system 500 includes processor(s) 501, memory 502, cache 503, persistent storage 505, communications unit 507, input/output (I/O) interface(s) 506, and communications fabric 504.

Communications fabric 504 provides communications between memory 502, cache 503, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses, such as a peripheral component interconnects (PCI) bus, or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, storage 103 is included in persistent storage 505.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 510 are stored in persistent storage 505 for access and/or execution by one or more of the respective processor(s) 501 via cache 503 and one or more memories of memory 502. With respect to system 102, software and data 510 includes data 104, data keys 105, security algorithms 106, storage information 107, secure data distribution program 200, secure data reconstitution program 300, and various programs (not shown). With respect to storage 120A through storage 120N software and data 510 respectively includes various programs and data (not show).

Communications unit 507, in these examples, provides for communications with other data processing systems or devices, including resources of system 102 and storage 120A through storage 120N. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computing system, such as an instance of node 10. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 510 used to practice embodiments of the present invention can be stored on such portable computer readable storage media and can be loaded onto persistent storage 505 via I/O interface(s) 506. I/O interface(s) 506 also connect to display 509.

I/O interface(s) 506 also allows one or more devices to interact with computer system/server 500; and/or any devices (e.g., network card, modem, etc.) that enable computer system/server 500 to communicate with one or more other computing devices. Such communication can occur via I/O interface(s) 506. Still yet, computer system/server 500 can communicate with one or more networks, such as a local area network (LAN), a general wide area network (WAN), and/or a public network (e.g., the Internet) via communications unit 507. It should be understood that although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

Display 509 provides a mechanism to display data to a user and may be, for example, a computer monitor. Display 509 can also function as a touch screen, such as the display of a tablet computer or a smartphone.

Figure 6:
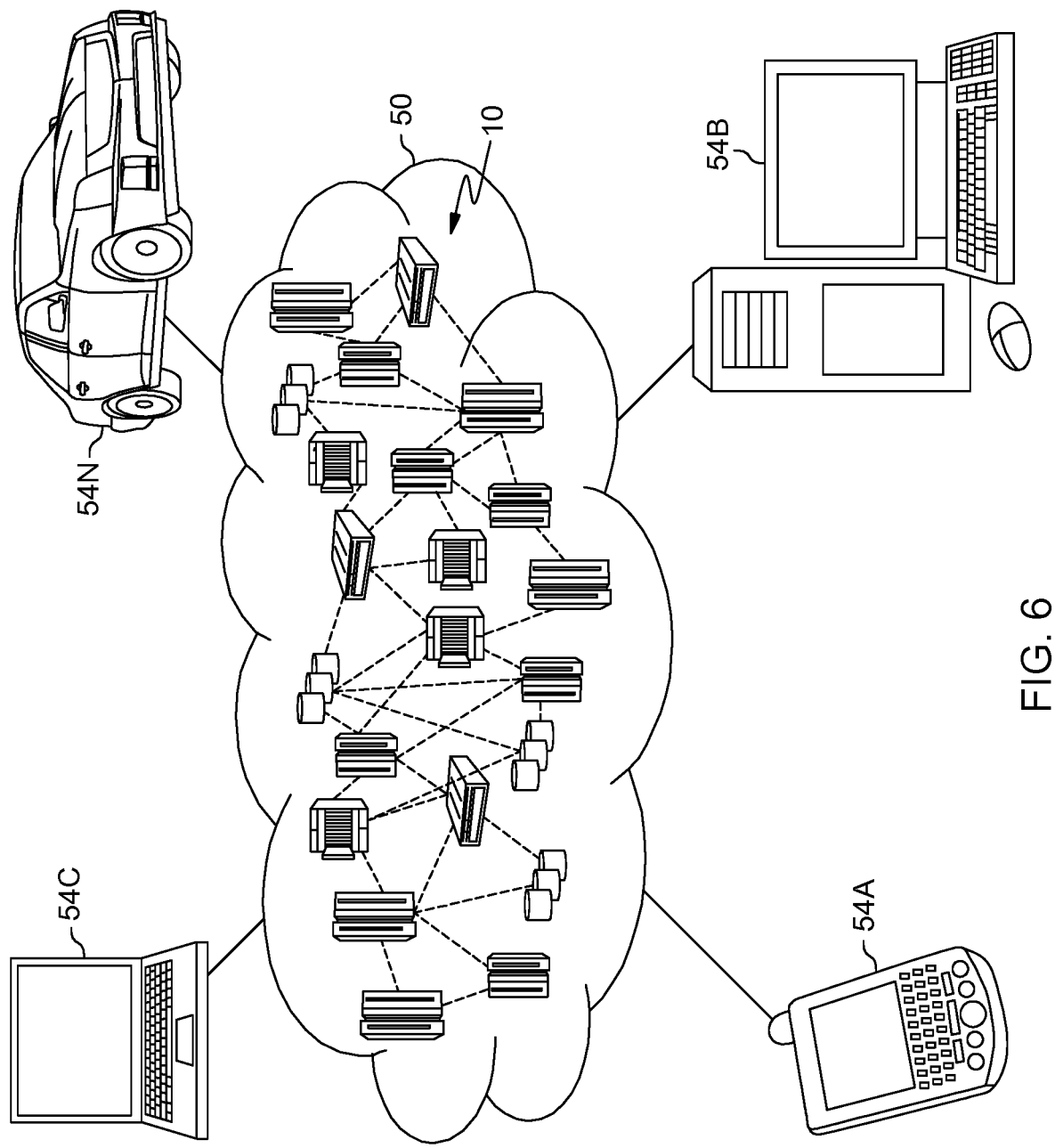
FIG. 6 depicts a cloud computing environment, according to an embodiment of the present invention.
Figure 7:
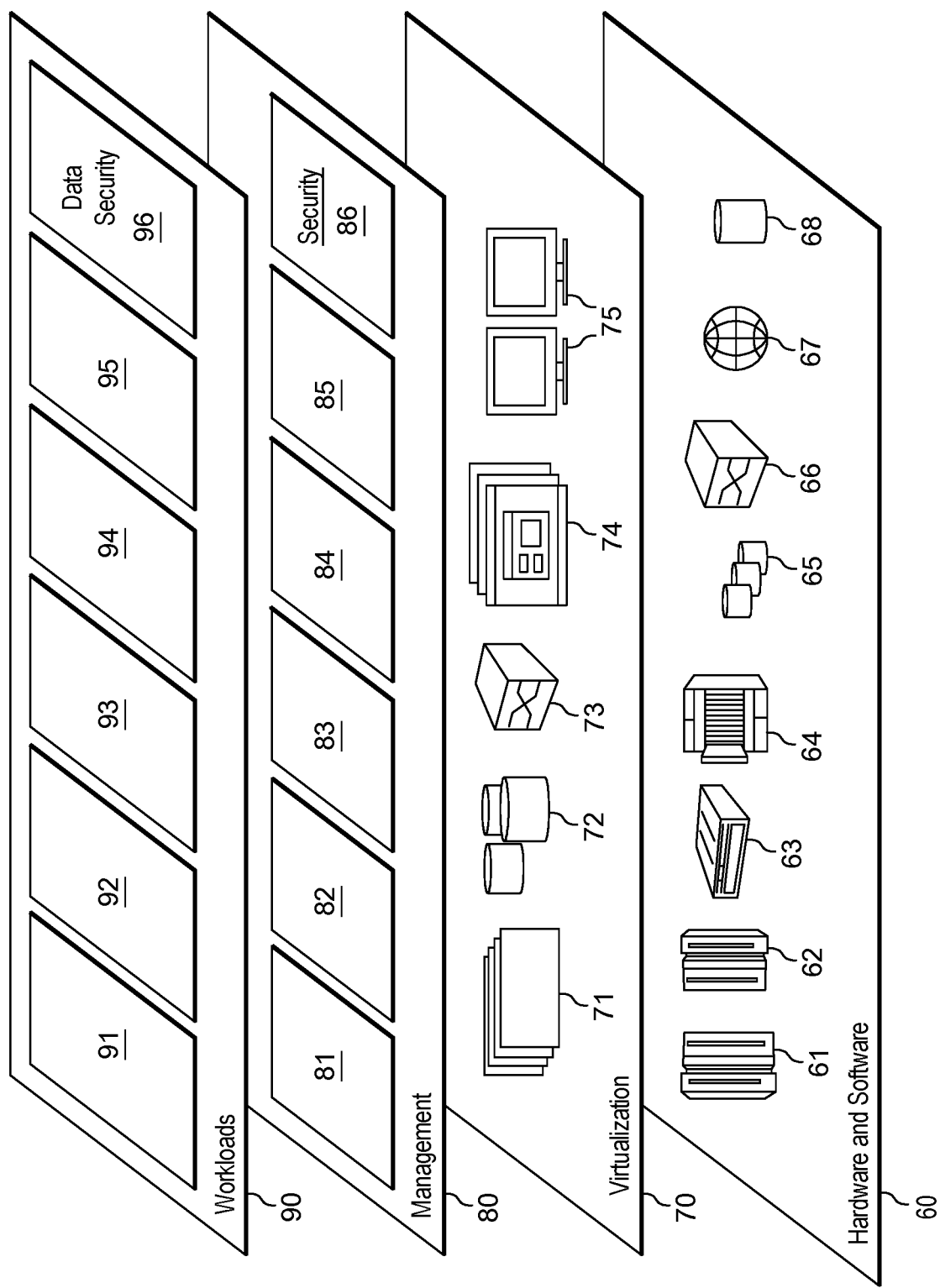
FIG. 7 depicts a set of functional abstraction layers of a cloud computing environment, according to an embodiment of the present invention.

FIG. 6 depicts an illustrative example of cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser). In addition, instance of cloud computing node 10 and computing devices 54A-N may include components, previously depicted and described in further detail with respect to FIG. 5, in accordance with embodiments of the present invention FIG. 7 depicts illustrative a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Security 86 provides identity verification for cloud consumers and tasks, as well as protection for data and other resources. In various embodiment, security 86 includes one or more system-based functions and/or subscribed services (e.g., secure data distribution program 200 and secure data reconstitution program 300) that protects data of a user or enterprise by distributing encoded and chunked data among a plurality of servers or storage systems of hardware and software layer 60 at different physical locations. In some embodiments, security 86 utilizes other aspects of management layer 80 to obtain access to resources within hardware and software layer 60 of different vendors or cloud-storage providers to store the encoded and chunked data of a user or enterprise.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security 96. In various embodiments, alternatively or in addition to security 86, data security 96 includes one or more or software applications, such as secure data distribution program 200 and secure data reconstitution program 300 that a user invokes to secure data within the cloud by distributing encoded and chunked data among a plurality of servers or storage systems of hardware and software layer 60 at different physical locations.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for securely storing data, the method comprising:
   receiving, by one or more computer processors, a request to store data, wherein the data includes a plurality of elements;
   converting, by one or more computer processors, the plurality of elements of the data into a plurality of corresponding numerical values, wherein the plurality of corresponding numerical values are respectively associated with index values, and wherein index value [i] begins at an index value of zero;
   generating, by one or more computer processors, a plurality of elements of encoded data values by applying one or more encoding algorithms to the plurality of corresponding numerical values of the converted plurality of elements of the data based on one or more dictates, wherein:
   (i) a quantity of the plurality of elements of encoded data values is equal to a quantity of the converted elements of the data;
   (ii) the plurality of elements of encoded data values are expressed as numerical values;
   (iii) a first encoding algorithm excludes a first element of the plurality of elements of encoded data values associated with an index value of [i]=0 from a first dictate; and
   (iv) the first dictate instructs the first encoding algorithm to utilize the numerical value of an encoded data value associated with the index value [i−1] and the numerical value of a converted element of data from the plurality of elements of the data associated with the index value [i−1] to generate an encoded data value corresponding to a converted element of data of the plurality of elements of the data associated with the index value [i];
   distributing, by one or more computer processors, the plurality of elements of the encoded data values into two or more subsets of encoded data values, without duplication; and
   transmitting, by one or more computer processors, the two or more subsets of the encoded data values to a corresponding quantity of two or more storage systems.

2. The method of claim 1, further comprising:
   determining, by one or more computer processors, based on a security dictate, to further obfuscate encoding of the plurality of elements of the data;
   selecting, by one or more computer processors, a data key to apply while encoding the plurality of elements of the data, wherein the data key includes two or more numeric values, and wherein the quantity of numeric values included with the data key is less than the quantity of elements included within the converted plurality of elements of the data; and
   applying, by one or more computer processors, a numeric value, cyclically selected from the data key to converted plurality of elements of the data in association with applying the first encoding algorithm, wherein cyclically selecting the numeric value from the data key further comprises:
   generating, by one or more computer processors, remainder values utilizing a first modulo operation where the index value respectively associated with the numerical value of an element of the converted plurality of elements of the data is the dividend of the first modulo operation and the quantity of numeric values included with the data key is the divisor of the first modulo operation.

3. The method of claim 1, wherein distributing the plurality of elements of the encoded data values into the two or more subsets of the encoded data values, without duplication further comprises:
distributing, by one or more computer processors, in a cyclical manner, subsequent elements of the plurality of elements of the encoded data values into the two or more subsets of the encoded data values.

4. The method of claim 1, wherein distributing the plurality of elements of the encoded data values into the two or more subsets of the encoded data values, without duplication further comprises:
determining, by one or more computer processors, based on a structure of at least the first encoding algorithm, that a value corresponding to a prior element of the plurality of elements of the encoded data values is utilized to encode a subsequent element of the plurality of elements of the data; and
distributing, by one or more computer processors, the plurality of elements of encoded data values into the two or more subsets of the encoded data values such that the subsequent element of the encoded data values is assigned to a subset of the encoded data values different from another subset of the encoded data values that includes the prior element of the plurality of elements of the encoded data values utilized to encode the subsequent element of the plurality of elements of the encoded data values.

5. The method of claim 1, wherein the two or more storage systems are storage systems at differing geographic locations.

6. A computer program product for securely storing data, the computer program product comprising:
one or more computer readable storage media and program instructions stored on the one or more computer readable storage media, the program instructions readable/executable by one or more computer processors:
program instructions to receive a request to store data, wherein the data includes a plurality of elements;
program instructions to convert the plurality of elements of the data into a plurality of corresponding numerical values, wherein the plurality of corresponding numerical values are respectively associated with index values, and wherein index value [i] begins at an index value of zero;
program instructions to generate a plurality of elements of encoded data values by applying one or more encoding algorithms to the plurality of corresponding numerical values of the converted plurality of elements of the data based on one or more dictates, wherein:
(i) a quantity of the plurality of elements of encoded data values is equal to a quantity of the converted elements of the data;
(ii) the plurality of elements of encoded data values are expressed as numerical values;
(iii) a first encoding algorithm excludes a first element of the plurality of elements of encoded data values associated with an index value of [i]=0 from a first dictate; and
(iv) the first dictate instructs the first encoding algorithm to utilize the numerical value of an encoded data value associated with the index value [i−1] and the numerical value of a converted element of data from the plurality of elements of the data associated with the index value [i−1] to generate an encoded data value corresponding to a converted element of data of the plurality of elements of the data associated with the index value [i];
program instructions to distribute the plurality of elements of the encoded data values into two or more subsets of encoded data values, without duplication; and
program instructions to transmit the two or more subsets of the encoded data values to a corresponding quantity of two or more storage systems.

7. The computer program product of claim 6, further comprising:
program instructions to determine, based on a security dictate, to further obfuscate encoding of the plurality of elements of the data;
program instruction to select a data key to apply while encoding the plurality of elements of the data, wherein the data key includes two or more numeric values, and wherein the quantity of numeric values included with the data key is less than the quantity of elements included within the converted plurality of elements of the data; and
program instruction to apply a numeric value, cyclically selected from the data key to converted plurality of elements of the data in association with applying the first encoding algorithm, wherein cyclically selecting the numeric value from the data key further comprises:
program instruction to generate remainder values utilizing a first modulo operation where the index value respectively associated with the numerical value of an element of the converted plurality of elements of the data is the dividend of the first modulo operation and the quantity of numeric values included with the data key is the divisor of the first modulo operation.

8. The computer program product of claim 6, wherein program instructions to distribute the plurality of elements of the encoded data values into the two or more subsets of the encoded data values, without duplication further comprise:
program instruction to distribute, in a cyclical manner, subsequent elements of the plurality of elements of encoded data values among the two or more subsets of encoded data values.

9. The computer program product of claim 6, wherein program instructions to distribute the plurality of elements of the encoded data values into the two or more subsets of the encoded data values, without duplication further comprise:
program instructions to determine, based on a structure of at least the first encoding algorithm, that a value corresponding to a prior element of the plurality of elements of the encoded data values is utilized to encode a subsequent element of the plurality of elements of the data; and
program instructions to distribute the plurality of elements of encoded data values into the two or more subsets of the encoded data values such that the subsequent element of the encoded data values is assigned to a subset of the encoded data values different from another subset of the encoded data values that includes the prior element of the plurality of elements of the encoded data values utilized to encode the subsequent element of the plurality of elements of the encoded data values.

10. The computer program product of claim 6, wherein the two or more storage systems are storage systems at differing geographic locations.

11. A computer system for securely storing data, the computer system comprising:
one or more computer processors;
one or more computer readable storage media; and program instructions stored on the computer readable storage media for execution by at least one of the one or more computer processors, the program instructions comprising:

program instructions to receive a request to store data, wherein the data includes a plurality of elements;

program instructions to convert the plurality of elements of the data into a plurality of corresponding numerical values, wherein the plurality of corresponding numerical values are respectively associated with index values, and wherein index value begins at an index value of zero;

program instructions to generate a plurality of elements of encoded data values by applying one or more encoding algorithms to the plurality of corresponding numerical values of the converted plurality of elements of the data based on one or more dictates, wherein:

(i) a quantity of the plurality of elements of encoded data values is equal to a quantity of the converted elements of the data;

(ii) the plurality of elements of encoded data values are expressed as numerical values;

(iii) a first encoding algorithm excludes a first element of the plurality of elements of encoded data values associated with an index value of [i]=0 from a first dictate; and (iv) the first dictate instructs the first encoding algorithm to utilize the numerical value of an encoded data value associated with the index value [i−1] and the numerical value of a converted element of data from the plurality of elements of the data associated with the index value [i−1] to generate an encoded data value corresponding to a converted element of data of the plurality of elements of the data associated with the index value [i]

program instructions to distribute the plurality of elements of the encoded data values into two or more subsets of encoded data values, without duplication; and program instructions to transmit the two or more subsets of the encoded data values to a corresponding quantity of two or more storage systems.

12. The computer system of claim 11, further comprising:
program instructions to determine, based on a security dictate, to further obfuscate encoding of the plurality of elements of the data;

program instruction to select a data key to apply while encoding the plurality of elements of the data, wherein the data key includes two or more numeric values, and wherein the quantity of numeric values included with the data key is less than the quantity of elements included within the converted plurality of elements of the data; and program instruction to apply a numeric value, cyclically selected from the data key to converted plurality of elements of the data in association with applying the first encoding algorithm, wherein cyclically selecting the numeric value from the data key further comprises:

program instruction to generate remainder values utilizing a first modulo operation where the index value respectively associated with the numerical value of an element of the converted plurality of elements of the data is the dividend of the first modulo operation and the quantity of numeric values included with the data key is the divisor of the first modulo operation.

13. The computer system of claim 11, wherein distributing the plurality of elements of the encoded data values into the two or more subsets of the encoded data values, without duplication further comprises:

program instructions to distribute, in a cyclical manner, subsequent elements of the plurality of elements of the encoded data values into the two or more subsets of the encoded data values.

14. The computer system of claim 11, wherein program instruction to distribute the plurality of elements of the encoded data values into the two or more subsets of the encoded data values, without duplication further comprises:

program instructions to determine, based on a structure of at least the first encoding algorithm, that a value corresponding to a prior element of the plurality of elements of the encoded data values is utilized to encode a subsequent element of the plurality of elements of the data; and program instructions to distribute the plurality of elements of encoded data values into the two or more subsets of the encoded data values such that the subsequent element of the encoded data values is assigned to a subset of the encoded data values different from another subset of the encoded data values that includes the prior element of the plurality of elements of the encoded data values utilized to encode the subsequent element of the plurality of elements of the encoded data values.

15. The method of claim 1, wherein generating the plurality of elements of encoded data values by applying the one or more encoding algorithms further comprises:

determining, by one or more computer processors, a first parameter value, the first parameter value equaling a maximum value among the plurality of corresponding numerical values of the converted plurality of elements of the data, plus a value of one;

identifying, by one or more computer processors, a second encoding algorithm that includes a second modulo operation; and generating, by one or more computer processors, a different plurality of encoded data values corresponding to a plurality of remainder values generated by utilizing the first parameter value as a divisor of the second modulo operation and each numerical value generated by the first encoding algorithm as the dividend of the second modulo operation.

16. The computer program product of claim 6, wherein program instructions to generate the plurality of elements of encoded data values by applying the one or more encoding algorithms further comprise:

program instructions to determine, a first parameter value, the first parameter value equaling a maximum value among the plurality of corresponding numerical values of the converted plurality of elements of the data, plus a value of one;

program instructions to identify a second encoding algorithm that includes a second modulo operation; and program instructions to generate a different plurality of encoded data values corresponding to a plurality of remainder values generated by utilizing the first parameter value as a divisor of the second modulo operation and each numerical value generated by the first encoding algorithm as the dividend of the second modulo operation.

17. The computer system of claim 11, wherein program instructions to generate the plurality of elements of encoded data values by applying the one or more encoding algorithms further comprise:

program instructions to determine, a first parameter value, the first parameter value equaling a maximum value among the plurality of corresponding numerical values of the converted plurality of elements of the data, plus a value of one;

program instructions to identify a second encoding algorithm that includes a second modulo operation; and program instructions to generate a different plurality of encoded data values corresponding to a plurality of remainder values generated by utilizing the first parameter value as a divisor of the second modulo operation and each numerical value generated by the first encoding algorithm as the dividend of the second modulo operation.

* * * * *